No. 877,947. PATENTED FEB. 4, 1908.
L. PENDLETON.
HORSESHOEING STALL.
APPLICATION FILED JUNE 14, 1907.

WITNESSES:

INVENTOR
Lewis Pendleton
BY
Attorneys

UNITED STATES PATENT OFFICE.

LEWIS PENDLETON, OF STANARDSVILLE, VIRGINIA.

HORSESHOEING-STALL.

No. 877,947.    Specification of Letters Patent.    Patented Feb. 4, 1908.

Application filed June 14, 1907. Serial No. 379,062.

*To all whom it may concern:*

Be it known that I, LEWIS PENDLETON, a citizen of the United States, residing at Stanardsville, in the county of Greene and State of Virginia, have invented certain new and useful Improvements in Horseshoeing-Stalls, of which the following is a specification.

This invention is a horseshoeing-stall and has for its object to provide a simple and practicable apparatus of this kind by means of which a vicious animal may be readily shod without danger of injury to the shoer.

Figure 1:
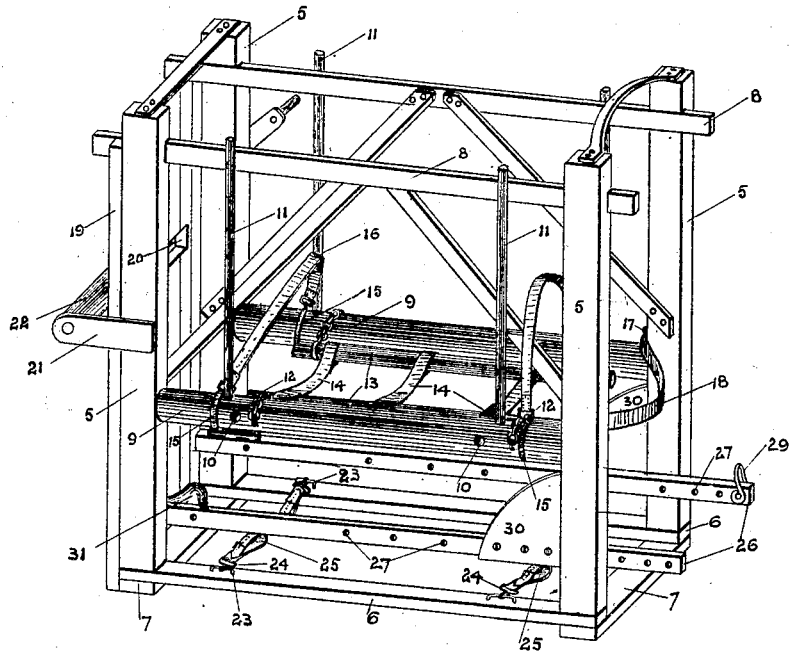
Figure 2:
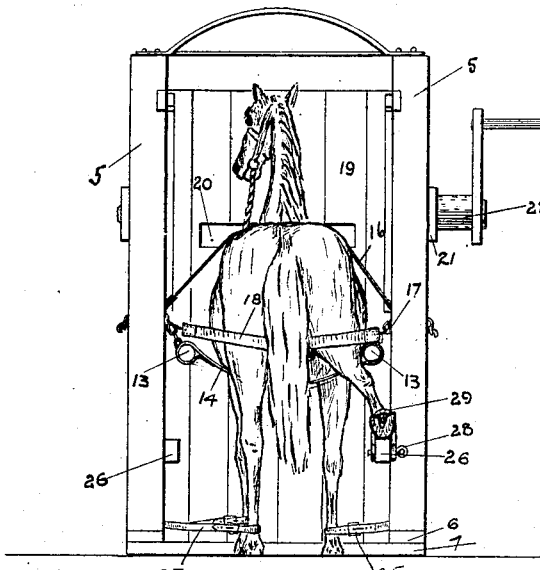

In the accompanying drawings Figure 1 is a perspective view of the invention. Fig. 2 is an end view.

In the drawings 5 denotes the corner posts of a frame to which the holding devices to be hereafter described are attached. Said posts are mounted on side sills 6 and end sills 7, and they are connected at the top by suitable braces 8. Between the posts, on each side of the frame are mounted rollers 9 having sockets 10 to receive operating levers 11. To the rollers are fastened chains 12 carrying at their free ends rods 13 which are connected by girth-straps 14 which pass under the body of the animal. By connecting the girth straps to the rods 13, and suspending the latter from the chains 12 mounted on the rollers 9, the straps can be adjusted simultaneously by rotating said rollers. On the rollers are also mounted loose rings 15 having hooks to which are attached straps 16 which pass over the back of the animal. The posts at the rear end of the frame have hooks 17 for attachment of a breeching-strap 18, and at the front end of the frame the posts are connected by a wall 19 having an opening 20. At this end of the frame on a suitable support 21 is mounted a windlass 22. On each of the side sills 6 are staples 23 to which are secured by means of snap hooks 24 hopples 25. To the posts 5 on each side of the machine are secured longitudinal bars 26 which project from the rear end of the frame. There bars have a series of transverse holes 27 to receive a pin 28 for securing a clevis 29 thereto. Between the bars 26 and the rear corner posts are arranged shields 30 to prevent the animal from getting his feet over said bars. At the front end of the bars are foot rests comprising blocks 31 which are fastened to the top of the bars.

In use, the animal is driven into the stall and secured by the various devices herein described. If necessary the windlass 22 can be employed for pulling the animal into the stall, the pulling strap passing through the opening 20. The straps 13 pass under the body of the animal and prevent him from lying down and he is prevented from jumping up by the straps 18 passing over his back. The straps 13 can be readily adjusted according to the height of the animal by winding or unwinding the chains 12, the rollers 9 being operated by the levers 11 for this purpose. The rollers have a number of sockets into any one of which the levers may be placed and the latter are such a length that they will engage the braces 8 at the top of the frame which therefore serve as a stop to prevent further unwinding of the chain from the rollers. The wall 19 prevents escape from the front end of the frame and the strap 18 which passes around the buttocks prevents the animal from backing out of the frame. The feet except the one to be operated on are secured by the hopples 25. The foot which is to receive the shoe is placed on top of the adjacent bar 26 and fastened thereto by passing the clevis 29 over the foot. The clevis is secured by the pin 28. After one foot is shod the clevis is removed and the foot is secured by one of the hopples, the next foot to be shod being released from the hopple and then raised and secured to the bar by the clevis in the same manner as the other foot was secured. The bars 26 have a sufficient number of openings 27 so that the clevis can be adjusted to reach each foot. If the front hoofs of the animal need trimming or dressing they can be placed on the blocks 31 and secured by the clevis.

The apparatus is fastened to the floor by means of the sills 7. If used out doors the sills will be left off and the corner posts made longer and driven directly into the ground.

By the apparatus herein described the animal will be securely held, and vicious, restless and nervous horses or other animals can be easily and expeditiously shod without danger of injury to the shoer.

The various adjustments and changes can be quickly made and the apparatus effectually serves the purpose for which it is intended.

I claim:

A horseshoeing stall comprising a supporting frame, rollers mounted on opposite sides thereof and having sockets, operating levers mounted in said sockets, chains fastened to the rollers, rods carried by the chains, straps connecting said rods, rings loosely mounted on the rollers, straps connected at their ends to the rings, a breeching-strap at one end of the frame, and means for securing the animal's feet.

In testimony whereof I affix my signature, in presence of two witnesses.

LEWIS PENDLETON.

Witnesses:
 CHAS. MILLER,
 JAS. A. BLAKEY.